(12) United States Patent
Jakkula et al.

(10) Patent No.: US 12,452,044 B2
(45) Date of Patent: Oct. 21, 2025

(54) SECURING NETWORK COMMUNICATIONS USING DYNAMICALLY AND LOCALLY GENERATED SECRET KEYS

(71) Applicant: Carrier Corporation, Palm Beach Gardens, FL (US)

(72) Inventors: Ravisankar Jakkula, Telangana (IN); Kirankumar Anumolu, Telangana (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 203 days.

(21) Appl. No.: 18/315,219

(22) Filed: May 10, 2023

(65) Prior Publication Data

US 2023/0379146 A1 Nov. 23, 2023

Related U.S. Application Data

(60) Provisional application No. 63/342,749, filed on May 17, 2022.

(51) Int. Cl.
*H04L 29/06* (2006.01)
*H04L 9/08* (2006.01)

(52) U.S. Cl.
CPC ............ *H04L 9/085* (2013.01); *H04L 9/0822* (2013.01); *H04L 9/0869* (2013.01)

(58) Field of Classification Search
CPC ..... H04L 9/085; H04L 9/0822; H04L 9/0869; H04L 9/3297; H04L 2209/84; H04L 9/0872; H04L 9/12
See application file for complete search history.

(56) References Cited

U.S. PATENT DOCUMENTS

| 7,209,561 | B1 | 4/2007 | Shankar et al. |
| 8,356,201 | B2 | 1/2013 | Newald |
| 8,542,069 | B2 | 9/2013 | Kelling et al. |
| 10,037,441 | B2 | 7/2018 | Kaluzhny et al. |
| 10,291,403 | B2 | 5/2019 | Ligatti et al. |
| 10,523,685 | B1 * | 12/2019 | Kostka ................. H04W 12/03 |
| 10,541,833 | B2 | 1/2020 | Andrews |
| 10,970,382 | B2 | 4/2021 | Hofman |

(Continued)

FOREIGN PATENT DOCUMENTS

| CN | 103746801 A | * 4/2014 |
| CN | 106920357 A | 7/2017 |

(Continued)

OTHER PUBLICATIONS

European Application No. 23174100.0 filed May 17, 2023; Extended European Search Report dated Feb. 5, 2024; 9 pages.

*Primary Examiner* — Shawnchoy Rahman
(74) *Attorney, Agent, or Firm* — CANTOR COLBURN LLP

(57) ABSTRACT

A communications network includes a bus communicatively coupled to a first device and a second device. The first device and the second device are operable to perform multiple iterations of a secret-key generation (SKG) process. Each of the multiple iterations of the SKG process includes the first device computing a first instance of a key seed; the second device computing a second instance of the key seed; the first device using the first instance of the key seed to generate a first instance of a secret key; and the second device using the second instance of the key seed to generate a second instance of the secret key.

20 Claims, 7 Drawing Sheets

(56) References Cited

U.S. PATENT DOCUMENTS

| | | |
|---|---|---|
| 2009/0245516 A1 | 10/2009 | Ravikiran |
| 2015/0033016 A1 | 1/2015 | Thornton et al. |
| 2018/0026962 A1* | 1/2018 | Kaladgi ................. G06F 21/30 |
| | | 713/159 |
| 2018/0337938 A1 | 11/2018 | Kneib et al. |
| 2019/0013941 A1* | 1/2019 | Ligatti ................. H04L 9/0827 |
| 2019/0253439 A1 | 8/2019 | Payton |
| 2019/0327235 A1* | 10/2019 | Brickell ............... H04L 9/3247 |
| 2021/0029096 A1* | 1/2021 | Hart ..................... H04L 9/0869 |
| 2021/0203682 A1 | 7/2021 | Bajpai |
| 2021/0377008 A1 | 12/2021 | Chien |
| 2022/0171832 A1* | 6/2022 | Gallagher ............. H04L 9/0866 |

FOREIGN PATENT DOCUMENTS

| | | |
|---|---|---|
| EP | 2748966 A1 | 7/2014 |
| IE | 20020742 A1 | 4/2003 |
| KR | 20160020866 A | 2/2016 |
| WO | 0191366 A2 | 11/2001 |
| WO | 2013042143 A1 | 3/2013 |
| WO | 2020208639 A2 | 10/2020 |

\* cited by examiner

SECURING NETWORK COMMUNICATIONS USING DYNAMICALLY AND LOCALLY GENERATED SECRET KEYS

CROSS-REFERENCE TO RELATED APPLICATIONS

This application claims the benefit of U.S. Provisional Application No. 63/342,749 filed May 17, 2022, the disclosure of which is incorporated herein by reference in its entirety.

BACKGROUND

Exemplary embodiments of the present disclosure relate in general to communications networks, and more particularly to systems and methods operable to secure network communications using dynamically and locally generated secret keys.

Data communication networks transmit digital data from one computer to another computer using a variety of communication channels and protocols. The physical connections between networked computing devices are established using cable media and/or wireless media. The best-known data communication network is actually a network of networks called an internetwork, or simply the Internet. The Internet is the world's largest network and uses a transmission control protocol/internet protocol (TCP/IP) as its protocol suite, along with using IP as its addressing protocol.

A variety of data communication networks have been developed for different applications. For example, the controller area networking (CAN) network (or CAN bus) was defined initially for use in automotive applications (CAN 2.0) and has been extended to other types of distributed industrial systems. CAN is unusual in that the entities on the network, called nodes, are not given specific addresses. Instead, it is the messages themselves that have an identifier, which also determines the messages' priority. Depending on their function, nodes transmit specific messages and look for specific messages. The CAN bus is a multi-master differential communication system in which messages are multicast, which means every microcontroller and component connected to the CAN bus receives each message. This design allows for multiple systems designed by multiple companies to be integrated together. The CAN bus architecture is robust from the standpoint that if one node fails all others nodes are still operational.

Although, the single bus consolidation approach used in CAN architectures can provide flexibility and robustness, there are security vulnerabilities in the area of message authentication. Known CAN bus architectures (e.g., CAN 2.0) lack a built-in authentication process for ensuring (or authenticating) that the message a node receives over the CAN bus is from a valid or trusted source. Thus, some form of message authentication must be added during implementation.

The term "cryptography" refers to authentication techniques that allow only the sender and intended recipient of a message to view its contents. Cryptography is closely associated with encryption, which is the act of scrambling ordinary text into what is known as ciphertext and then back again upon arrival. When transmitting electronic data, the most common use of cryptography is to encrypt and decrypt the transmitted messages using an asymmetric or "public key" system in which every user has two keys—one public and one private. Senders request the public key of their intended recipient, encrypt the message and send it along. When the message arrives, only the recipient's private key will decode it.

Cryptography techniques also use so-called "certificates" to improve the security of asymmetric public key systems. A certificate is a digital document that vouches for the identity and key ownership of entities, such as an individual, a computer system, a specific server running on that system, and the like. Certificates are issued by certificate authorities, which are entities (usually a trusted third party to a transaction) that are trusted to sign or issue certificates for other people or entities.

A shortcoming of known asymmetric public key cryptography systems is that, independent of their effectiveness in performing authentication tasks, they still require a secure method of sending the required keys and/or certificates to the communicating parties.

Accordingly, there is a need to effectively and efficiently address message authentication as upfront requirements when developing a data communication network (e.g., a CAN bus network) for a particular application.

BRIEF DESCRIPTION

According to an embodiment, a communications network includes a bus communicatively coupled to a first device and a second device. The first device and the second device are operable to perform multiple iterations of a secret-key generation (SKG) process. Each of the multiple iterations of the SKG process includes the first device computing a first instance of a key seed; the second device computing a second instance of the key seed; the first device using the first instance of the key seed to generate a first instance of a secret key; and the second device using the second instance of the key seed to generate a second instance of the secret key.

In addition to one or more of the features described above, or as an alternative to any of the foregoing embodiments, the communications network includes the first device further operable to use the first instance of the secret key to encrypt communications from the first device to the second device over the bus.

In addition to one or more of the features described above, or as an alternative to any of the foregoing embodiments, the communications network includes the second device further operable to use the second instance of the secret key to decrypt the communications sent from the first device to the second device over the bus.

In addition to one or more of the features described above, or as an alternative to any of the foregoing embodiments, the communications network includes the second device further operable to use the second instance of the secret key to encrypt communications from the second device to the first device over the bus.

In addition to one or more of the features described above, or as an alternative to any of the foregoing embodiments, the communications network includes the first device further operable to use the first instance of the secret key to decrypt the communications sent from the second device to the first device over the bus.

In addition to one or more of the features described above, or as an alternative to any of the foregoing embodiments, the communications network includes the first instance of the secret key not being transmitted to or from the first device; and the second instance of the secret key not being transmitted to or from the second device.

In addition to one or more of the features described above, or as an alternative to any of the foregoing embodiments, the communications network includes the encrypted communications from the first device to the second device over the bus comprising a new version of the key seed.

In addition to one or more of the features described above, or as an alternative to any of the foregoing embodiments, the communications network is operable such that the key seed include a propagation delay over the bus and between the first device and the second device.

In addition to one or more of the features described above, or as an alternative to any of the foregoing embodiments, the communications network includes the first device operable to compute the first instance of the propagation delay while not performing any other operations; the first device computing the first instance of the propagation delay includes the first device sending a first test message to the second device and the second device sending a second test message to the first device; the second device being operable to compute the second instance of the propagation delay while not performing any other operations; and the second device computing the second instance of the propagation delay including the second device sending a third test message to the first device and the first device sending a fourth test message to the first device.

In addition to one or more of the features described above, or as an alternative to any of the foregoing embodiments, the communications network includes each of the multiple iterations of the SKG process being spaced apart from one another by a first time window. The first time window is less than a second time window; and the second time window defines a minimum time required by a third device to couple to the bus and determine the secret key without using the SKG process.

According to another embodiment, a method of operating a communications network includes using a secret-key generation (SKG) process. Each of the multiple iterations of the SKG process includes the first device computing a first instance of a key seed; the second device computing a second instance of the key seed; the first device using the first instance of the key seed to generate a first instance of a secret key; and the second device using the second instance of the key seed to generate a second instance of the secret key.

In addition to one or more of the features described above, or as an alternative to any of the foregoing embodiments, the method of operating the communications network includes using the first device to detect error messages on the bus generated by a third device communicatively coupled to the bus.

In addition to one or more of the features described above, or as an alternative to any of the foregoing embodiments, the method of operating the communications network includes the second device operable to use the second instance of the secret key to decrypt the communications sent from the first device to the second device over the bus.

In addition to one or more of the features described above, or as an alternative to any of the foregoing embodiments, the method of operating the communications network includes the second device further operable to use the second instance of the secret key to encrypt communications from the second device to the first device over the bus.

In addition to one or more of the features described above, or as an alternative to any of the foregoing embodiments, the method of operating the communications network includes the first device further operable to use the first instance of the secret key to decrypt the communications sent from the second device to the first device over the bus.

In addition to one or more of the features described above, or as an alternative to any of the foregoing embodiments, the method of operating the communications network includes the first instance of the secret key not being transmitted to or from the first device; and the second instance of the secret key not being transmitted to or from the second device.

In addition to one or more of the features described above, or as an alternative to any of the foregoing embodiments, the method of operating the communications network includes the encrypted communications from the first device to the second device over the bus comprising a new version of the key seed.

In addition to one or more of the features described above, or as an alternative to any of the foregoing embodiments, the method of operating the communications network includes the key seed implemented to include a propagation delay over the bus and between the first device and the second device.

In addition to one or more of the features described above, or as an alternative to any of the foregoing embodiments, the method of operating the communications network includes the first device operable to compute the first instance of the propagation delay while not performing any other operations; the first device computing the first instance of the propagation delay includes the first device sending a first test message to the second device and the second device sending a second test message to the first device; the second device being operable to compute the second instance of the propagation delay while not performing any other operations; and the second device computing the second instance of the propagation delay including the second device sending a third test message to the first device and the first device sending a fourth test message to the first device.

In addition to one or more of the features described above, or as an alternative to any of the foregoing embodiments, the method of operating the communications network includes each of the multiple iterations of the SKG process being spaced apart from one another by a first time window. The first time window is less than a second time window; and the second time window defines a minimum time required by a third device to couple to the bus and determine the secret key without using the SKG process.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
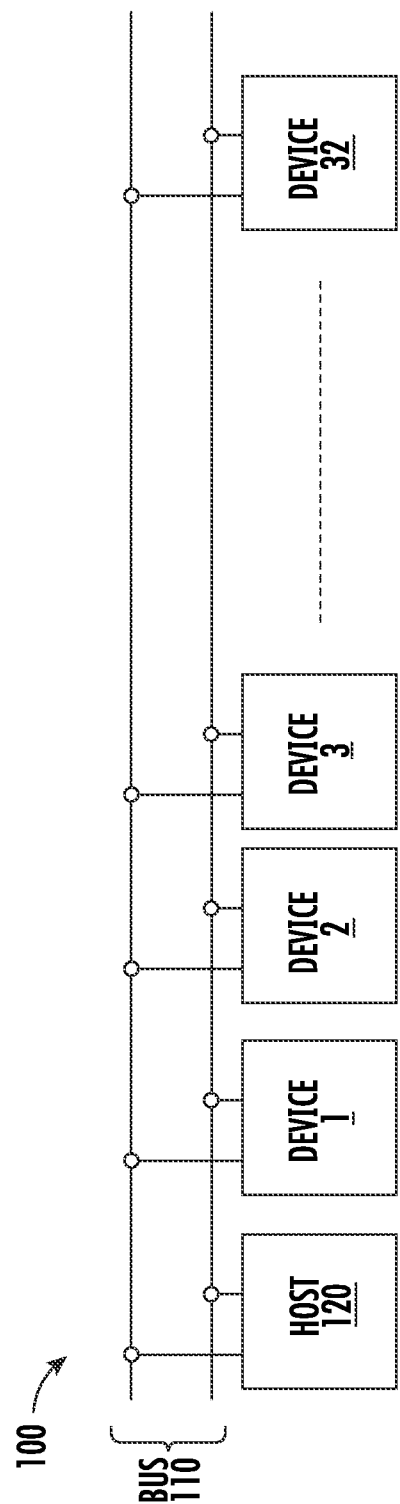
FIG. 1 is a block diagram of a CAN bus operable to implement a secret-key generation process according to an embodiment.

A detailed description of one or more embodiments of the disclosed systems and methods are presented herein by way of exemplification and not limitation with reference to the Figures.

Embodiments of the present disclosure provide methods and systems that effectively and efficiently provide network message authentication in a data communication network such as a CAN bus network. In embodiments of the disclosure, message authentication is provided by implementing a dynamic secret-key generation process for communications placed on or retrieved from the CAN bus. The disclosed dynamic secret-key generation process does not suffer from the shortcomings of known asymmetric public key systems is that, unlike known asymmetric public key systems, the disclosed dynamic secret-key generation process enables each of the communicating entities to independently and dynamically generate its own instance of a secret key that will be used in their communications, thereby avoiding the need to securely and reliably transmit the secret key (and/or certificates) to the communicating entities that need them. The disclosed secret-key generation process is operable to ensure that each separate instance of the secret key generated at a network node is the same. In general, a secret key is the piece of information or parameter that is used to encrypt and decrypt messages in a symmetric, or secret-key, encryption scheme. This is in contrast to asymmetric encryption, which uses two separate keys—one public key and one secret key. A secret key may also be known as a private key. In accordance with some embodiments, the functionality in the network nodes (or communicating entities) that is operable to independently and dynamically generate the secret key that will be used in their communications is enabled by using a time-stamp exchange round trip delay algorithm that allows each of the communicating entities to independently and dynamically capture a propagation delay (i.e., capture the same propagation delay). Each of the network nodes uses the captured propagation delay to independently and dynamically generate the secret key that will be used in their communications. In some embodiments, the CAN bus protocol is configured to implement the time-stamp exchange round trip delay algorithm while no other processing is performed by the CAN network nodes, which ensure that the network nodes (or communicating entities) will independently and dynamically capture substantially the same propagation delay.

Malicious devices that access the CAN bus can include hacking software that attempts to analyze bus traffic in a manner that might possibly, if given enough time, allow the malicious device to determine the secret key that is currently being used to encrypt/decrypt messages on the bus. To combat such hacking software, embodiments of the disclosure change to a new secret key at a frequency that ensures that a malicious device with hacking software has insufficient time to figure out the currently-used secret encryption/decryption key before the currently-used secret encryption/decryption key is changed. In some embodiments, the frequency at which the currently-used secret encryption/decryption key is changed is also dynamic to vary the time window between when the currently-used secret encryption/decryption key is changed to a new secret encryption/decryption key. Thus, in accordance with embodiments, the dynamically generated secret key is highly secure in that it is generated at the host and at the device; it is not transmitted; it is dynamically changed before it can be hacked; and the rate at which the secret key is changed can also be dynamic.

With reference now to FIG. 1, embodiments of the disclosure can be applied to a variety of communications networks, including but not limited to a CAN bus system 100. In accordance with embodiments of the disclosure, the CAN bus system 100 is operable to implement a dynamic secret-key generation process according to embodiments. The CAN bus system 100 is depicted in FIG. 1 as a simplified diagram illustrating a host node/device 120 and multiple connected devices 1-32 in communication over a bus 110. The CAN bus system 100 is a peer-to-peer network, which means there is no master that controls when CAN devices (host 120 and devices 1-32) have access to read and write data on the bus 110. When a CAN device is ready to transmit data, it checks to see if the bus 110 is busy then simply writes a CAN frame (not shown) onto the bus 110. The CAN frames that are transmitted do not contain addresses of either the transmitting device or any of the intended receiving devices(s). Instead, an arbitration ID that is unique throughout the CAN bus system 100 labels the frame. All CAN devices (host 120 and devices 1-32) on the CAN bus system 100 receive the CAN frame, and, depending on the arbitration ID of that transmitted frame, each CAN device on the CAN bus system 100 decides whether to accept the frame. If multiple CAN devices (host 120 and device 1-32) attempt to transmit a message onto the bus 110 at the same time, the device with the highest priority (lowest arbitration ID) automatically receives access to the bus 110. Lower-priority devices must wait until the bus 110 becomes available before trying to transmit again. In this way, the CAN bus system 100 ensures deterministic communication among CAN devices (host 120 and devices 1-32).

Figure 2:
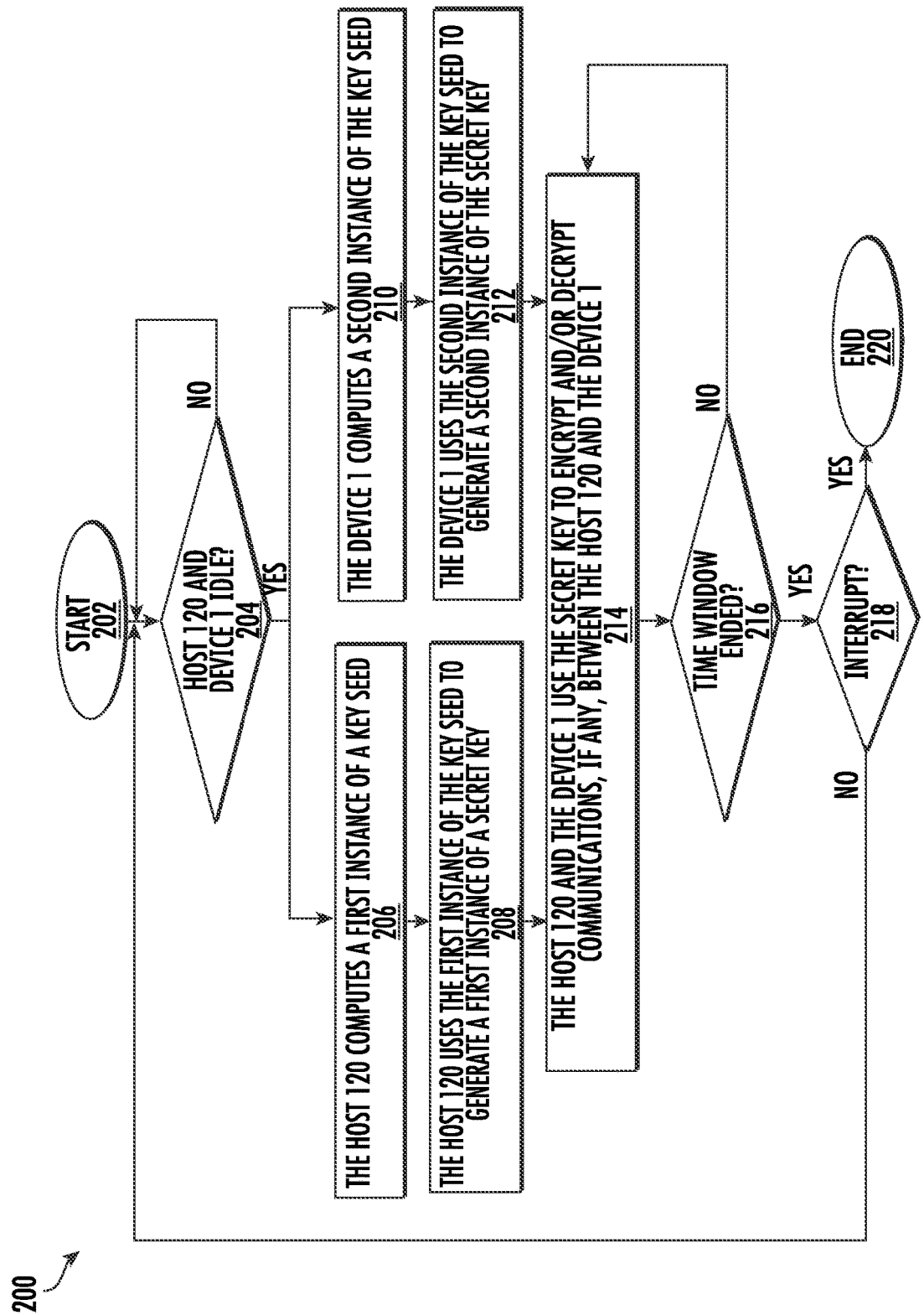
FIG. 2 is a flow diagram of a method of operating a CAN bus using a secret-key generation process according to an embodiment.

FIG. 2 is a flow diagram illustrating a methodology 200 in accordance with embodiments. The methodology 200 is implemented by a communications network, such as the CAN bus system 100, to perform a dynamic secret-key generation process in accordance with embodiments of the disclosure. For ease of explanation, the methodology 200 is described with reference to communications between the host 120 and device 1. However, the methodology 200 is applicable to communications between and among any of the devices on the CAN bus 110. The methodology 200 begins at block 202 then moves to decision block 204 to determine whether or not the bus 110, the host 120, and the device 1 are idle, which means that they are not transmitting data or performing any other operations that could impact the computation of the key seed at blocks 206 and 210. In accordance with embodiments, the operations at block 206, 210 are performed during a period when the operations at blocks 206, 210 are the only operations being performed by the bus 110, the host 120 and the device 1, respectively. This ensures that the first instance of the key seed computed by the host 120 at block 206 will be the same as the second instance of the key seed computed by device 1 at block 210. In some embodiments of the invention, the methodology 200 can include functionality to determine whether the host 120 or the device 1 was interrupted during either block 206 or block 210, and restarts the methodology 200 if any such interruption occurs. If the answer to the inquiry at decision block 204 is no, the methodology 200 returns to the input to decision block 204 to continue evaluating whether the host 120 and the device 1 are idle. If the answer to the inquiry at decision block 204 is yes, the methodology 200 moves on parallel paths through blocks 206, 208 and blocks 210, 212 to compute a first instance of a key seed at the host 120 (block 206) and compute a second instance of the key seed at device 1 (block 210). In some embodiments of the disclosure, the key seed computed at blocks 206, 210 is based on a detected propagation delay between the host 120 and device 1 over the bus 110. In embodiments, at block 208, the host 120 applies the first instance of the key seed to a pseudorandom number generator to generate a pseudo random number that is used by the host 120 at block 208 to generate a first instance of a secret key. Similarly, at block 212, the device 1 applies the second instance of the key seed to a pseudorandom number generator to generate a pseudo random number that is used by the device 1 at block 210 to generate a second instance of the secret key. From blocks 208, 212, the methodology 200 moves to block 214 and the host 120 and the device 1 use the secret key to encrypt and/or decrypt communications, if any, between the host 120 and the device 1.

From block 214, the methodology 200 moves to decision block 216 to determine whether or not a time window (or time limit) for using the secret key determined at blocks 208, 212 has ended. In embodiments, the time window can be set such that it is less than an expected minimum duration of time that would be required for the cyber threat module (not shown in FIG. 1) to use hacking software to determine the secret key determined at blocks 208, 212 without using the methodology 200. In some embodiments, the time window at decision block 216 can be dynamically changed for different iterations of the methodology 200. If the answer to the inquiry at decision block 216 is no, the methodology 200 returns to block 214 and continues encrypting and/or decrypting communications using the secret key.

If the answer to the inquiry at decision block 216 is yes, the methodology 200 moves to decision block 218 to determine whether any kind of interrupt request has been received. If the answer to the inquiry at decision block 218 is yes, the methodology 200 moves to block 220 and ends. If the answer to the inquiry at decision block 218 is no, the methodology 200 returns to block decision 204 to perform another iteration of the methodology 200 to again change the secret key for encrypting and/or decrypting communications between or among legitimate devices (e.g., host 120 and devices 1-32) on the communications network (e.g., CAN bus 110).

The dynamic secret-key generation process of the methodology 200 can be executed as part of the protocol of the CAN bus system 100. Details of how blocks 206, 208, 210, 212 of the methodology 200 can be implemented in accordance with some embodiments of the disclosure are depicted in FIGS. 3-4 and described in greater detail below.

Figure 3:
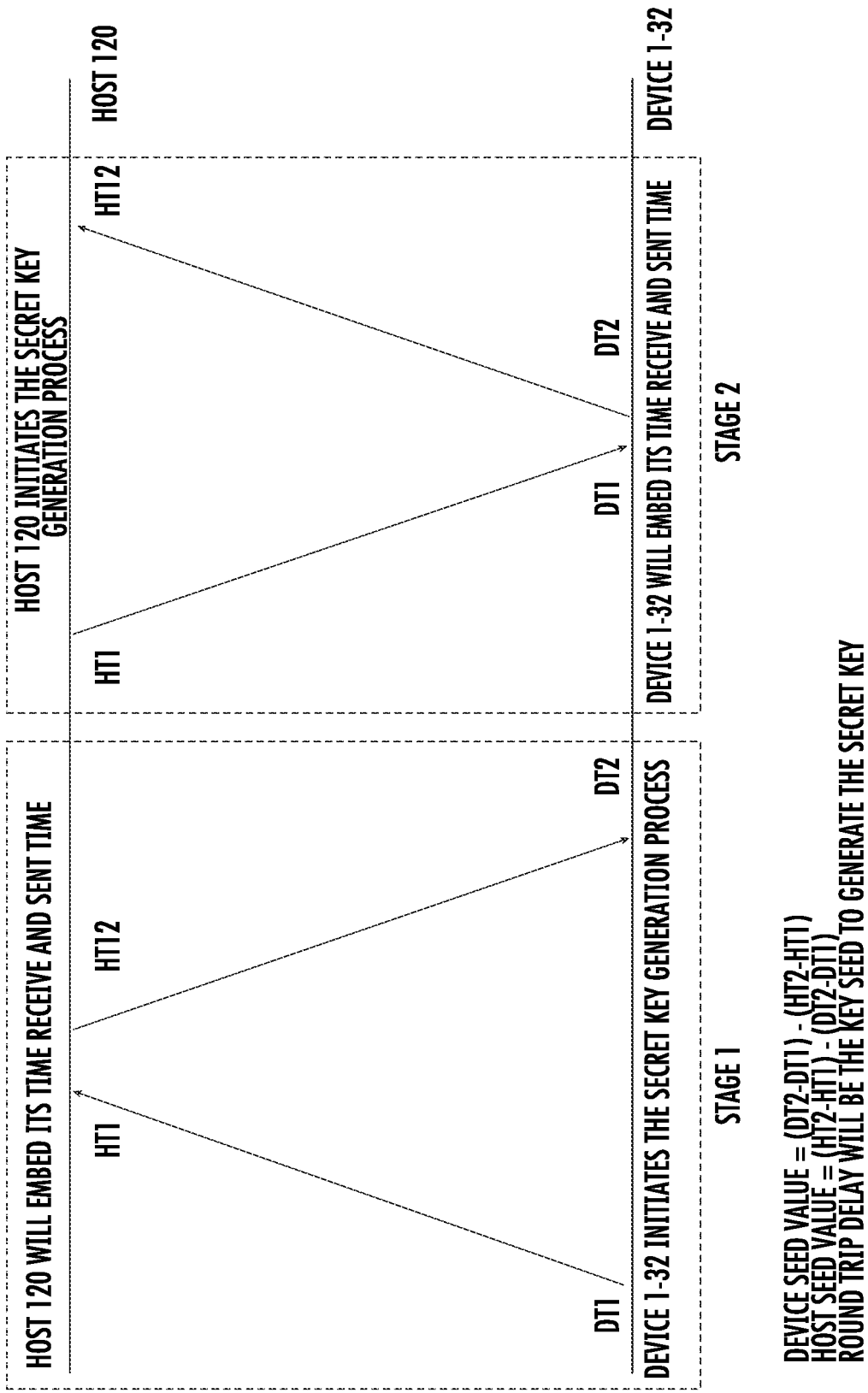
FIG. 3 is a diagram illustrating aspects of a secret-key generation process according to an embodiment.
Figure 7:
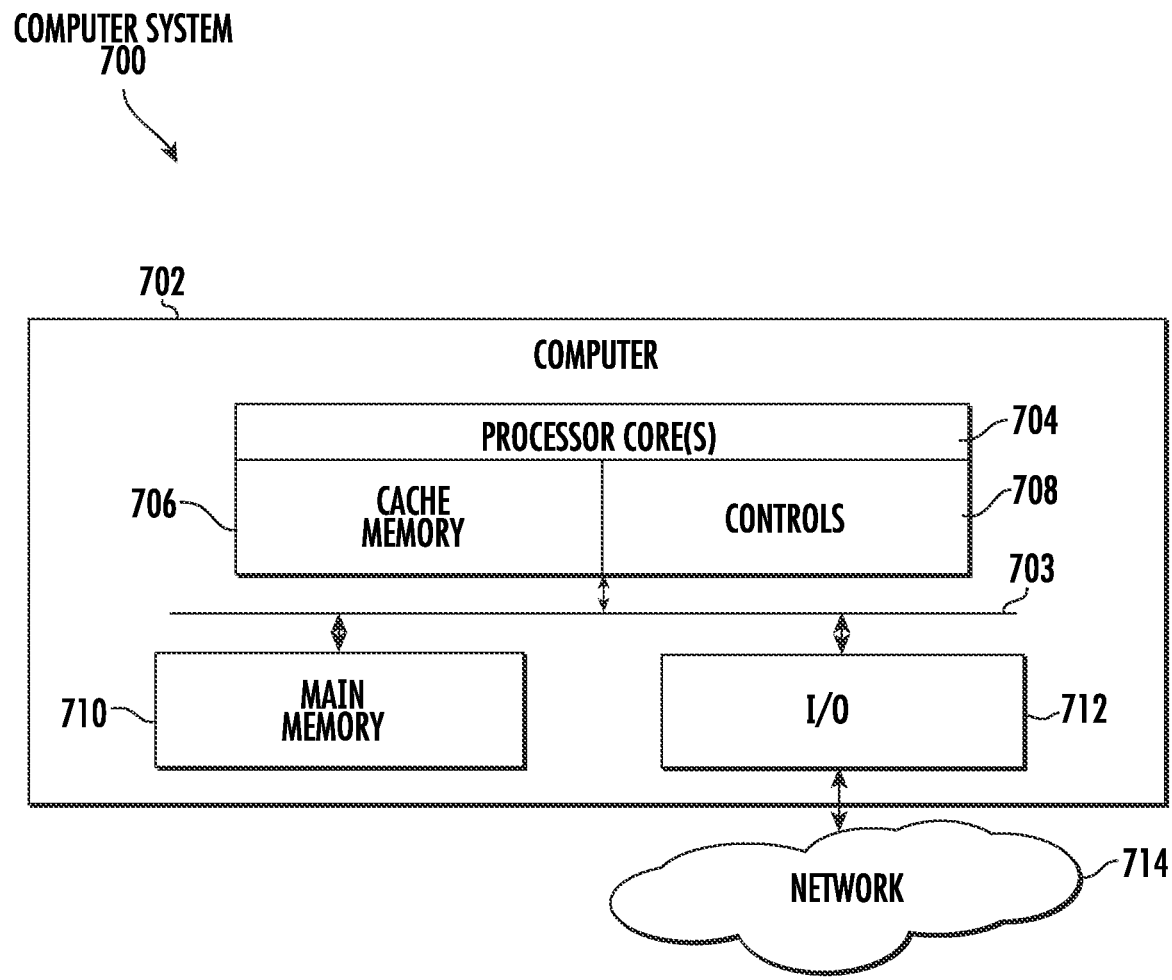
FIG. 7 is a block diagram of a programmable computer system operable to implement aspects of a secret-key generation process according to embodiments of the present disclosure.

FIG. 3 is a diagram illustrating how the secret key can be generated in accordance with embodiments of the disclosure. Prior to any encryption operations, all of the devices (host 120 and devices 1-32) communicate normally (without exchanging any critical data). At this point, the host 120 will not process the data coming from the device 1-32 as the data is not encrypted. As shown in FIG. 7, at Stage 1, the device (devices 1-32) initiates the secret-key generation process by sending an error message. This error message contains the information indicating that the device has started the secret-key generation process. After receiving this message, the host 120 embeds 2-time stamps (one is message arrival time and the other one is message dispatch time) (each one has 4 bytes and the resolution of time one count per 22 uSec) as shown in FIG. 7. Now the device (devices 1-32) will receive the message, and the device will know when it initiated the message and when it received the response. Based on this information, the device will calculate the round-trip delay and hold the round-trip delay as the seed that will be used to generate the secret key. The host 120 starts the same procedure performed by the device (devices 1-32) and will also compute the round-trip delay. At the end, by providing the tolerance for these round-trip values, the expectation is both values (i.e., those generated by the devices 1-32 and the host 120) must be same.

Figure 4:
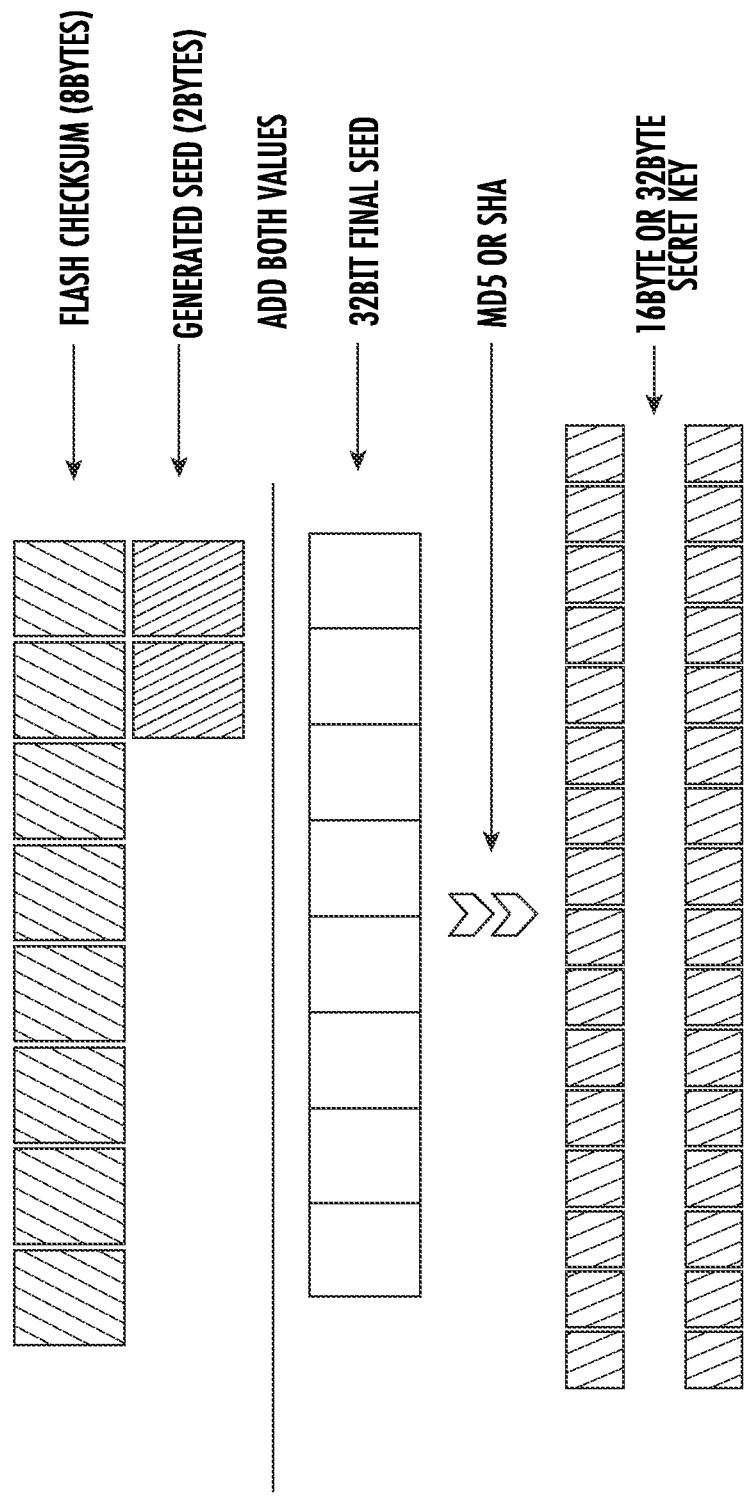
FIG. 4 is a diagram illustrating aspects of a secret-key generation process according to an embodiment.

As depicted in FIG. 4, now that the device (devices 1-32) and the host 120 have the same key seed, each one (the host 120 and the devices 1-32) determines a secret key based on the process shown in FIG. 4. It is noted that embodiments of the disclosure are not limited to a using 8 bytes of firmware checksum. Instead of checksum, any form of 8 bytes can be used that can understood by the host 120 and the devices 1-32, including, for example, a MAC address of the device 1-32 or any other unique 8 bytes that can be statically defined at the host 120. As depicted in FIG. 4, the generated seed (2 bytes long) is added to the module firmware checksum (8 bytes long) to generate a 32-bit final key seed. The flash checksum is a form of CRC that is available at both the host 120 and the devices 1-32 to validate that they all have the same key seed value. In general, if a device knows the checksum of the original file (e.g., the key seed), the device can run a checksum on it. If the resulting checksum matches, the device knows that the file it received is identical to the original file. Any suitable hash method (e.g., MD5 or SHA256) is run on the 32-bit final seed to generate the secure secret key of 16-bytes or 32-bytes. After constructing the secret key, DES (data encryption standard) encryption or triple DES encryption can be used to encrypt the message. The host 120 will send a hello message to the device (devices 1-32) and the device must acknowledge the received hello message by sending a response hello message. If the host 120 does not receive the hello message within a predetermined time frame, the host 120 will start the process of generating the key seed again.

Figure 5:
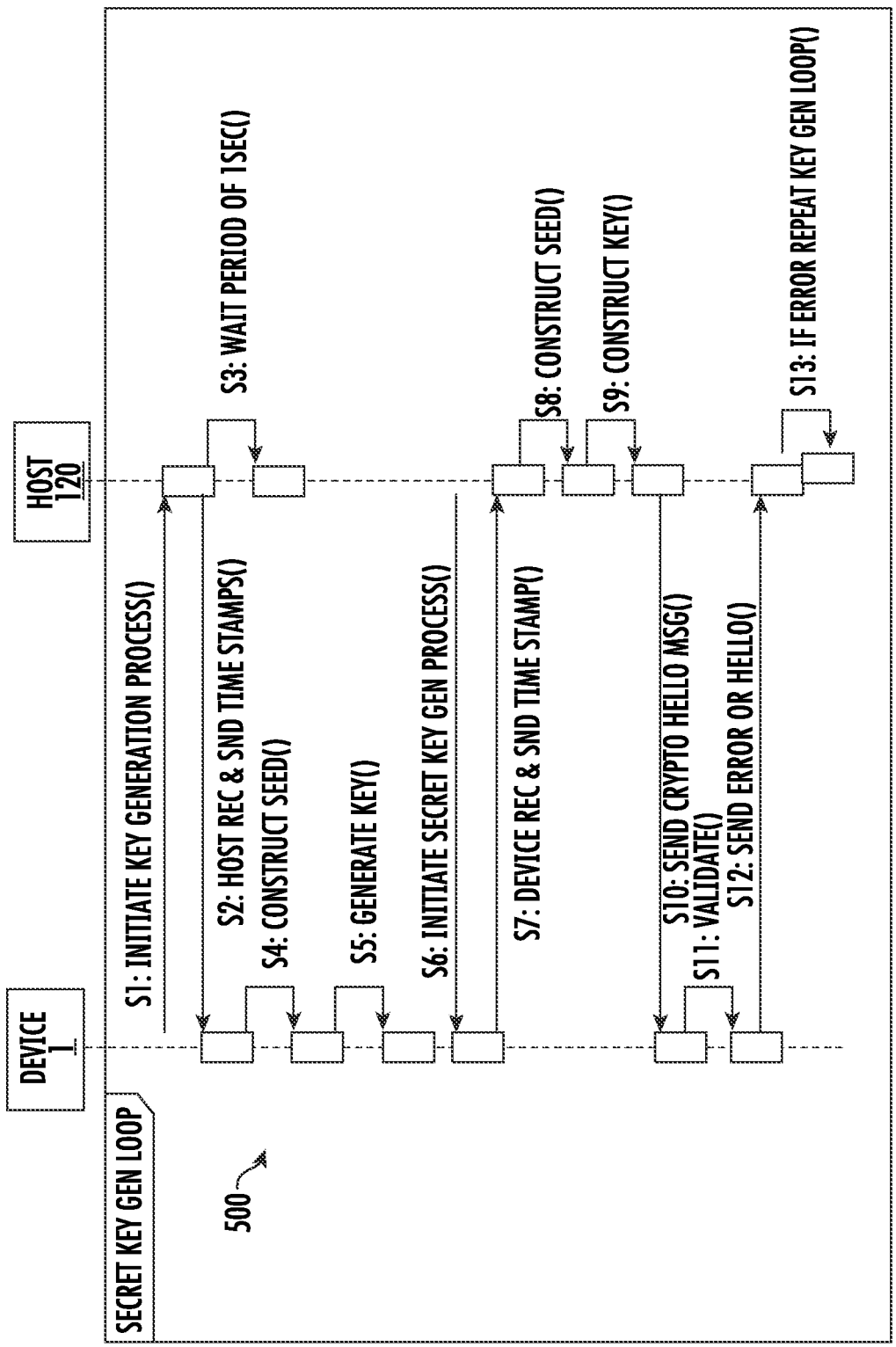
FIG. 5 is a diagram illustrating aspects of a secret-key generation process according to an embodiment.

Details of how blocks 206, 208, 210, 212 of the methodology 200 can be implemented in accordance with some embodiments of the disclosure are depicted in FIG. 5 and described in greater detail below. The methodology 500 depicted in FIG. 5 proceeds as follows. The device (devices 1-32) performs Steps 1, 2, 4-7, and 10-12; and the host 120 perform Steps 3, 8, 9, and 13. At Step 1 (S1), the device (devices 1-32) initiates the secret-key generation process; and at Step 2 (S2), the host 120 sends time stamps to the device (devices 1-32). At Step 3 (S2), the host 120 waits for a period (e.g., 1 second). At Step 4 (S4), the device (devices 1-32) constructs the seed; and at Step 5 (S5), the device (devices 1-32) generates the key from the seed. At Step 6 (S6), the host 120 initiates the secret-key generation process. At Step 7, the device (devices 1-32) sends time stamps to the host 120. At Step 8 (S8), the host 120 constructs the seed; and at Step 9 (S9), the host 120 generates the key from the seed. At Step 10 (S10), the host 120 sends a cryptographic hello message. At Step 11, the device (devices 1-32) performs a validation on the received cryptographic hello message then at Step 12 (S12), the device (devices 1-32) sends an error or hello message to the host 120 based on results of the validation at S11. At Step 13 (S13), if the host 120 detects an error it repeats the secret-key generation loop of the methodology 500.

Figure 6:
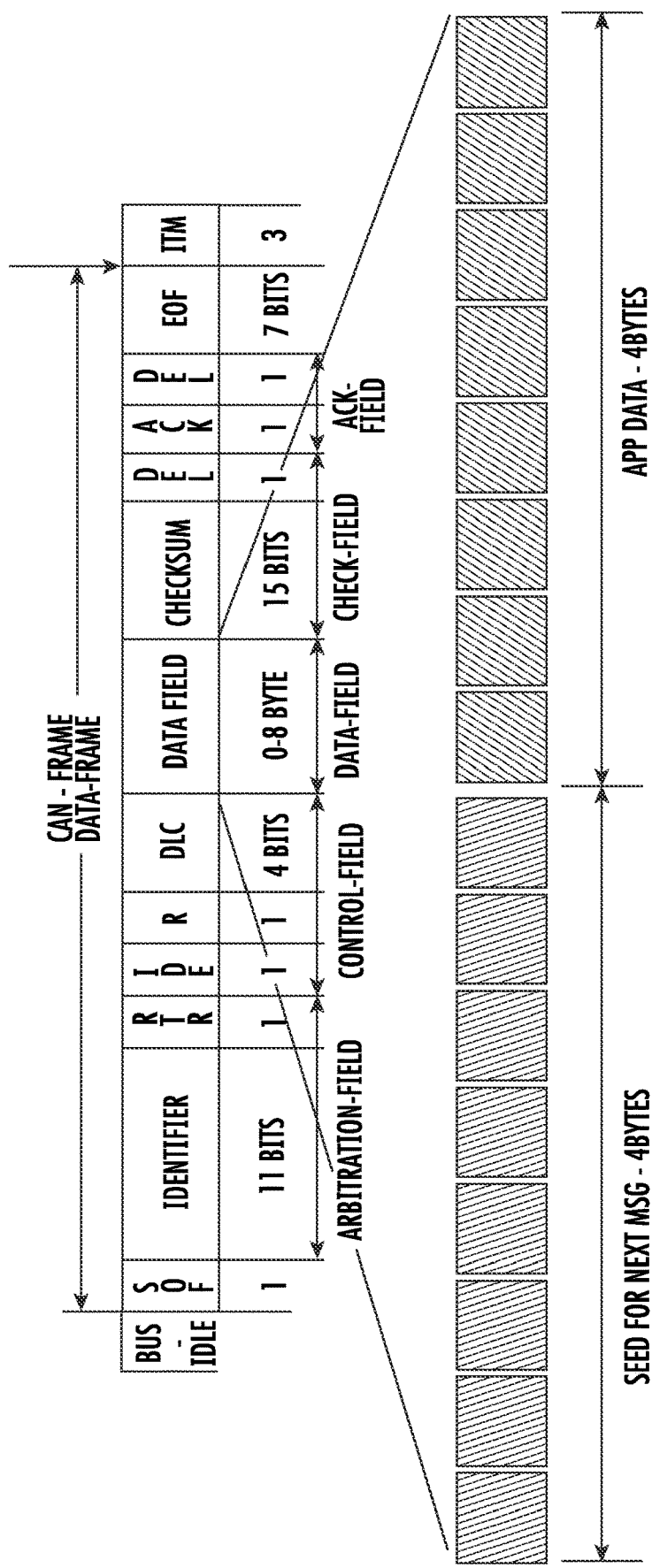
FIG. 6 is a diagram illustrating aspects of a secret-key generation process according to an embodiment.

FIG. 6 depicts an example of how the seed for the next message is located within the data field of a CAN data frame. Once the communication has started with fully encrypted messages, the next communication is initiated by either the host 120 or the device (devices 1-32) using the current key (depends on the data from device or the configuration from the host 120) and provides the seed to generate the new key. If there are no events from host 120 or the device (devices 1-32) (e.g., no events for about 30 seconds), the host 120 can take responsibility and send a new seed as part of a reconcile operation.

FIG. 7 illustrates an example of a computer system 700 that can be used to implement the aspects of the disclosure described herein. The computer system 700 includes an exemplary computing device ("computer") 702 configured for performing various aspects of the content-based semantic monitoring operations described herein in accordance embodiments of the disclosure. In addition to computer 702, exemplary computer system 700 includes network 714, which connects computer 702 to additional systems (not depicted) and can include one or more wide area networks (WANs) and/or local area networks (LANs) such as the Internet, intranet(s), and/or wireless communication network(s). Computer 702 and additional system are in communication via network 714, e.g., to communicate data between them.

Exemplary computer 702 includes processor cores 704, main memory ("memory") 710, and input/output component(s) 712, which are in communication via bus 703. Processor cores 704 includes cache memory ("cache") 706 and controls 708, which include branch prediction structures and associated search, hit, detect and update logic, which will be described in more detail below. Cache 706 can include multiple cache levels (not depicted) that are on or off-chip from processor 704. Memory 710 can include various data stored therein, e.g., instructions, software, routines, etc., which, e.g., can be transferred to/from cache 706 by controls 708 for execution by processor 704. Input/output component(s) 712 can include one or more components that facilitate local and/or remote input/output operations to/from computer 702, such as a display, keyboard, modem, network adapter, etc. (not depicted).

Embodiments of the disclosure described herein can be a system, a method, and/or a computer program product at any possible technical detail level of integration. The computer program product may include a computer readable storage medium (or media) having computer readable program instructions thereon for causing a controller or processor to carry out aspects of the embodiments of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For the sake of brevity, conventional techniques related to making and using the disclosed embodiments may or may not be described in detail herein. In particular, various aspects of computing systems and specific computer programs to implement the various technical features described herein are well known. Accordingly, in the interest of brevity, many conventional implementation details are only mentioned briefly or are omitted entirely without providing the well-known system and/or process details.

Many of the function units of the systems described in this specification have been labeled or described as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the disclosure, the operations performed by the various components, modules, sub-functions, and the like can be distributed differently than shown without departing from the scope of the various embodiments described herein unless it is specifically stated otherwise.

For convenience, some of the technical operations described herein are conveyed using informal expressions. For example, a processor that has key data stored in its cache memory can be described as the processor "knowing" the key data. Similarly, a user sending a load-data command to a processor can be described as the user "telling" the processor to load data. It is understood that any such informal expressions in this detailed description should be read to cover, and a person skilled in the relevant art would understand such informal expressions to cover, the formal and technical description represented by the informal expression.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A communications network comprising:
    a bus external to and electronically coupled to a first device and a second device;
    wherein the first device and the second device are configured to perform multiple iterations of a secret-key generation (SKG) process;
    wherein each of the multiple iterations of the SKG process comprises:
        based at least in part on a determination that a prior time window has ended, the first device computing a first instance of a key seed associated with a current time window;
        based at least in part on the determination that the prior time window has ended, the second device computing a second instance of the key seed associated with the current time window;
        the first device using the first instance of the key seed to generate a first instance of a secret key associated with the current time window;
        the second device using the second instance of the key seed to generate a second instance of the secret key associated with the current time window; and
        based at least in part on a determination that the current time window has ended, initiating a next one of the multiple iterations of the SKG process, wherein the next one of the multiple iterations of the SKG process is associated with a new current time window.

2. The communications network of claim 1, wherein the first device is further configured to:
    use the first instance of the secret key associated with the current time window to encrypt communications from the first device to the second device over the bus during the current time window; and
    discontinue using the first instance of the secret key associated with the current time window to encrypt communications from the first device to the second device over the bus after the current time window has ended.

3. The communications network of claim 2, wherein the second device is further configured to:
    use the second instance of the secret key associated with the current time window to decrypt the communications sent from the first device to the second device over the bus during the current time window; and
    discontinue using the second instance of the secret key associated with the current time window to decrypt the communications sent from the first device to the second device over the bus after the current time window has ended.

4. The communications network of claim 3, wherein the second device is further configured to:
    use the second instance of the secret key associated with the current time window to encrypt communications from the second device to the first device over the bus during the current time window; and
    discontinue using the second instance of the secret key associated with the current time window to encrypt communications from the second device to the first device over the bus after the current time window has ended.

5. The communications network of claim 4, wherein the first device is further configured to:
    use the first instance of the secret key associated with the current time window to decrypt the communications sent from the second device to the first device over the bus during the current time window; and
    discontinue using the first instance of the secret key associated with the current time window to decrypt the communications sent from the second device to the first device over the bus after the current time window has ended.

6. The communications network of claim 5, wherein:
    the first instance of the secret key is not transmitted to or from the first device; and
    the second instance of the secret key is not transmitted to or from the second device.

7. The communications network of claim 1, wherein the next one of the multiple iterations of the SKG process generates a new version of the key seed associated with the new current time window.

8. The communications network of claim 1, wherein:
    the prior time window, the current time window, and the new current time window are each less than a second time window; and
    the second time window defines a minimum time required by a third device to couple to the bus and determine the secret key without using the SKG process.

9. A communications network comprising:
    a bus external to and electronically coupled to a first device and a second device;
    wherein the first device and the second device are operable to perform multiple iterations of a secret-key generation (SKG) process;
    wherein each of the multiple iterations of the SKG process comprises:
        the first device computing a first instance of a key seed;
        the second device computing a second instance of the key seed;
        the first device using the first instance of the key seed to generate a first instance of a secret key; and
        the second device using the second instance of the key seed to generate a second instance of the secret key;
    wherein the key seed comprises a propagation delay over the bus and between the first device and the second device;
    wherein the first device is configured to compute the first instance of the propagation delay while not performing any other operations;
    wherein the first device computing the first instance of the propagation delay comprises the first device sending a first test message to the second device and the second device sending a second test message to the first device;

wherein the second device is configured to compute the second instance of the propagation delay while not performing any other operations; and wherein the second device computing the second instance of the propagation delay comprises the second device sending a third test message to the first device and the first device sending a fourth test message to the first device.

10. The communications network of claim 9, wherein:

each of the multiple iterations of the SKG process is spaced apart from one another by a first time window;

the first time window is less than a second time window; and the second time window defines a minimum time required by a third device to couple to the bus and determine the secret key without using the SKG process.

11. A method of operating a communications network, the method comprising:

using a first device and a second device to perform multiple iterations of a secret-key generation (SKG) process, wherein each of the multiple iterations of the SKG process comprises:

based at least in part on a determination that a prior time window has ended, the first device computing a first instance of a key seed associated with a current time window;

based at least in part on the determination that the prior time window has ended, the second device computing a second instance of the key seed associated with the current time window;

the first device using the first instance of the key seed to generate a first instance of a secret key associated with the current time window;

the second device using the second instance of the key seed to generate a second instance of the secret key associated with the current time window; and based at least in part on a determination that the current time window has ended, initiating a next one of the multiple iterations of the SKG process, wherein the next one of the multiple iterations of the SKG process is associated with a new current time window.

12. The method of claim 11, wherein the first device is further configured to:

use the first instance of the secret key associated with the current time window to encrypt communications from the first device to the second device over the bus during the current time window; and discontinue using the first instance of the secret key associated with the current time window to encrypt communications from the first device to the second device over the bus after the current time window has ended.

13. The method of claim 12, wherein the second device is further configured to:

use the second instance of the secret key associated with the current time window to decrypt the communications sent from the first device to the second device over the bus during the current time window; and discontinue using the second instance of the secret key associated with the current time window to decrypt the communications sent from the first device to the second device over the bus after the current time window has ended.

14. The method of claim 13, wherein the second device is further configured to;

use the second instance of the secret key associated with the current time window to encrypt communications from the second device to the first device over the bus during the current time window; and discontinue using the second instance of the secret key associated with the current time window to encrypt communications from the second device to the first device over the bus after the current time window has ended.

15. The method of claim 14, wherein the first device is further configured to;

use the first instance of the secret key associated with the current time window to decrypt the communications sent from the second device to the first device over the bus during the current time window; and discontinue using the first instance of the secret key associated with the current time window to decrypt the communications sent from the second device to the first device over the bus after the current time window has ended.

16. The method of claim 15, wherein:

the first instance of the secret key is not transmitted to or from the first device; and the second instance of the secret key is not transmitted to or from the second device.

17. The method of claim 11, wherein the next one of the multiple iterations of the SKG process generates a new version of the key seed associated with the new current time window.

18. The method of claim 11, wherein the key seed comprises a propagation delay over the bus and between the first device and the second device.

19. The method of claim 18, wherein:

the first device is operable to compute the first instance of the propagation delay while not performing any other operations;

the first device computing the first instance of the propagation delay comprises the first device sending a first test message to the second device and the second device sending a second test message to the first device;

the second device is operable to compute the second instance of the propagation delay while not performing any other operations; and the second device computing the second instance of the propagation delay comprises the second device sending a third test message to the first device and the first device sending a fourth test message to the first device.

20. The method of claim 11, wherein:

the prior time window, the current time window, and the new current time window are each less than a second time window; and the second time window defines a minimum time required by a third device electronically coupled to the bus to determine the secret key without using the SKG process.

* * * * *